(12) United States Patent
Kamimura

(10) Patent No.: US 8,878,974 B2
(45) Date of Patent: Nov. 4, 2014

(54) IMAGING DEVICE WITH LENS BARRELL INFORMATION COMMUNICATIONS

(75) Inventor: Masayuki Kamimura, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/554,187

(22) Filed: Jul. 20, 2012

(65) Prior Publication Data

US 2013/0021514 A1 Jan. 24, 2013

(30) Foreign Application Priority Data

Jul. 21, 2011 (JP) ................................ 2011-160093

(51) Int. Cl.
*H04N 5/225* (2006.01)
*G02B 13/16* (2006.01)
*H04N 5/343* (2011.01)
*H04N 5/232* (2006.01)

(52) U.S. Cl.
CPC ........... *H04N 5/23209* (2013.01); *H04N 5/343* (2013.01); *H04N 5/23245* (2013.01)
USPC .......................................... 348/335; 348/340

(58) Field of Classification Search
USPC ................................................. 348/340, 335
See application file for complete search history.

(56) References Cited

U.S. PATENT DOCUMENTS

2003/0193600 A1 10/2003 Kitamura et al.
2012/0051731 A1* 3/2012 Hamada et al. ............... 396/124

FOREIGN PATENT DOCUMENTS

JP 2003-289469 A 10/2003
JP 2007-322922 A 12/2007

OTHER PUBLICATIONS

U.S. Appl. No. 13/525,468 to Masayuki Kamimura, filed Jun. 18, 2012.
U.S. Appl. No. 13/557,588 to Masayuki Kamimura, filed Jul. 25, 2012.
U.S. Appl. No. 13/529,100 to Masayuki Kamimura, filed Jun. 21, 2012.

* cited by examiner

*Primary Examiner* — Antoinette Spinks
(74) *Attorney, Agent, or Firm* — Greenblum & Bernstein, P.L.C.

(57) ABSTRACT

An imaging device is provided that includes a camera body, a lens barrel, a lens barrel information transmitter, and an image sensor driver. The image sensor is housed in the camera body. The lens barrel is attachable to and detachable from the camera body. The lens barrel information transmitter regularly transmits information of the lens barrel to the camera body. The image sensor driver drives the image sensor at one of at least two different frame rates where a second frame rate is higher than a first frame rate. The amount of data being transmitted is reduced by the lens barrel information transmitter when the image sensor is driven at the second frame rate, compared to the amount transmitted when the image sensor is driven at the first frame rate.

10 Claims, 6 Drawing Sheets

N: NORMAL MODE LENS INFO.
E: REGULAR INST.

IMAGING DEVICE WITH LENS BARRELL INFORMATION COMMUNICATIONS

BACKGROUND OF THE INVENTION

1. Field of the Invention

The present invention relates to an imaging device in which data is transmitted between a lens barrel and a camera body provided with an image sensor.

2. Description of the Related Art

In an interchangeable-lens camera communication generally occurs between separate controllers located on the camera body and lens barrel through contact points that are provided on a lens mount. For example, instruction signals and synchronous signals for driving the lens and controlling a photographing operation may be fed from the camera body to the controller of the lens barrel. On the other hand, position information of the focusing lens may be fed from the lens to the controller of the camera body (refer to Kokai 2007-322922).

SUMMARY OF THE INVENTION

However, as camera makers increase the number of actuators provided inside the lens barrel, information related to the status of the lens barrel that should be delivered to the camera body in real time is also increasing. As transmitted data increases, the controller of the camera body needs to spend more time in communication. Therefore, the available time for the image sensor operation is reduced because of the data communication between the lens barrel and the lens body, which makes it more difficult to drive the image sensor at a relatively high frame rate.

Therefore, one aspect of the present invention is to optimize communication between the camera body and the lens barrel while enabling the image sensor to operate at a high frame rate.

According to the present invention, an imaging device is provided that includes a camera body, a lens barrel, a lens barrel information transmitter, and an image sensor driver. The camera body is provided with an image sensor.

The lens barrel is attachable to and detachable from the camera body. The lens barrel information transmitter regularly transmits information of the lens barrel to the camera body. The image sensor driver drives the image sensor at one of at least two different frame rates where a second frame rate is higher than a first frame rate. The amount of data being transmitted is reduced by the lens barrel information transmitter when the image sensor is driven at the second frame rate, compared to the amount transmitted when the image sensor is driven at the first frame rate.

In another aspect of the invention, a lens barrel attachable to and detachable from a camera body equipped with an image sensor is provided. The lens barrel includes the lens barrel information transmitter and a frame rate determiner.

The lens barrel information transmitter regularly transmits information of the lens barrel to the camera body. The frame rate determiner determines whether the image sensor in the camera body is driven at the first frame rate or at the second frame rate that is higher than the first frame rate. The amount of data being transmitted is reduced by the lens barrel information transmitter when the image sensor is driven at the second frame rate, compared to the amount transmitted when the image sensor is driven at the first frame rate.

In another aspect of the invention, a camera body from which a lens barrel is attachable and detachable is provided and equipped with the image sensor, a lens barrel information receiver, and an image sensor driver.

The lens barrel information receiver regularly receives information of the lens barrel. The image sensor driver drives the image sensor at one of at least two different frame rates where the second frame rate is higher than the first frame rate. The amount of data being transmitted is reduced by the lens barrel information transmitter when the image sensor is driven at the second frame rate, compared to the amount transmitted when the image sensor is driven at the first frame rate.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
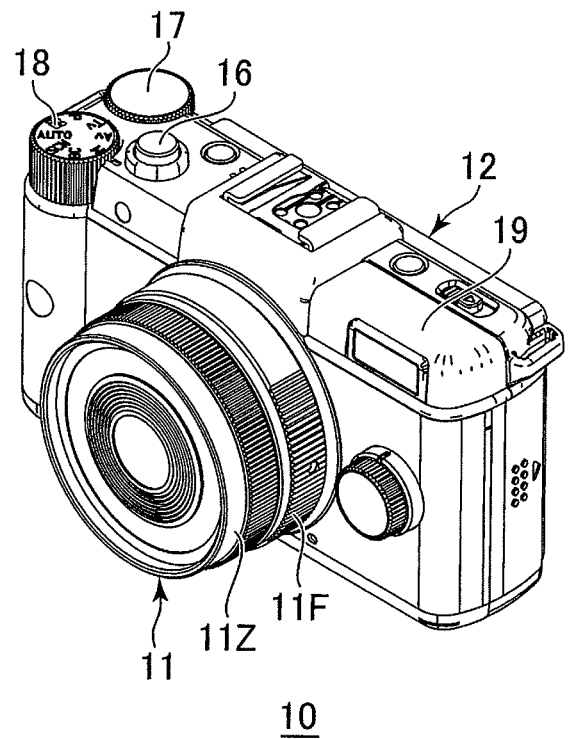
FIG. 1 is a perspective view of an interchangeable-lens camera with a lens barrel attached.

The present invention is described below with references to the embodiments shown in the drawings.

Figure 2:
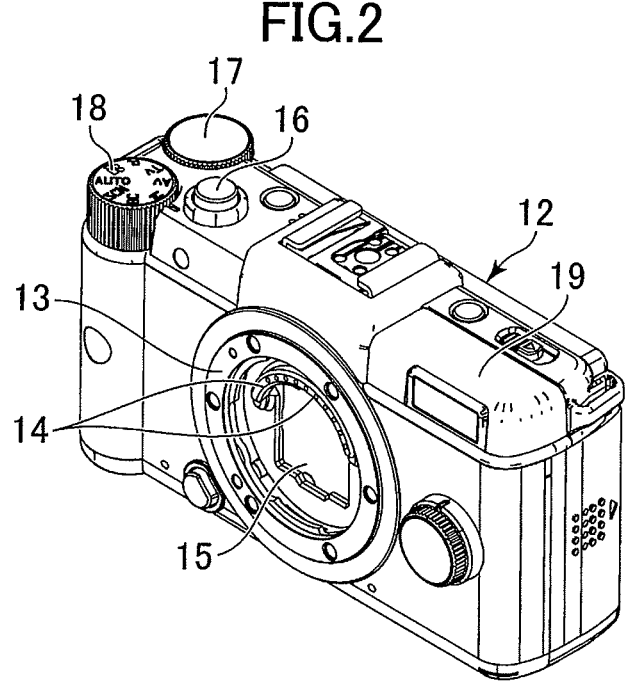
FIG. 2 is a perspective view of the camera body alone, from which the lens barrel has been removed.

FIG. 1 is a perspective view of an interchangeable-lens camera with a lens barrel attached. FIG. 2 is a perspective view of the camera body alone, from which the lens barrel has been removed.

For the interchangeable-lens camera 10, the lens barrel 11 is detachable from the camera body 12. The lens barrel 11 may include a zoom lens as well as a focus lens and be further provided with a focus ring 11F and zoom ring 11Z for adjusting the positions of the focus lens and zoom lens, respectively.

A plurality of contact points 14 is arranged in an arcuate configuration on the inner side of a lens mount 13 of the camera body 12, and an image sensor unit 15 is installed inside the camera body 12 at the position corresponding to the center of the lens mount 13. A flash 19 and switches including a release button 16, an E-dial 17 (a shaft encoder) and a mode dial 18 may be provided on the top of the camera body 12.

Figure 3:
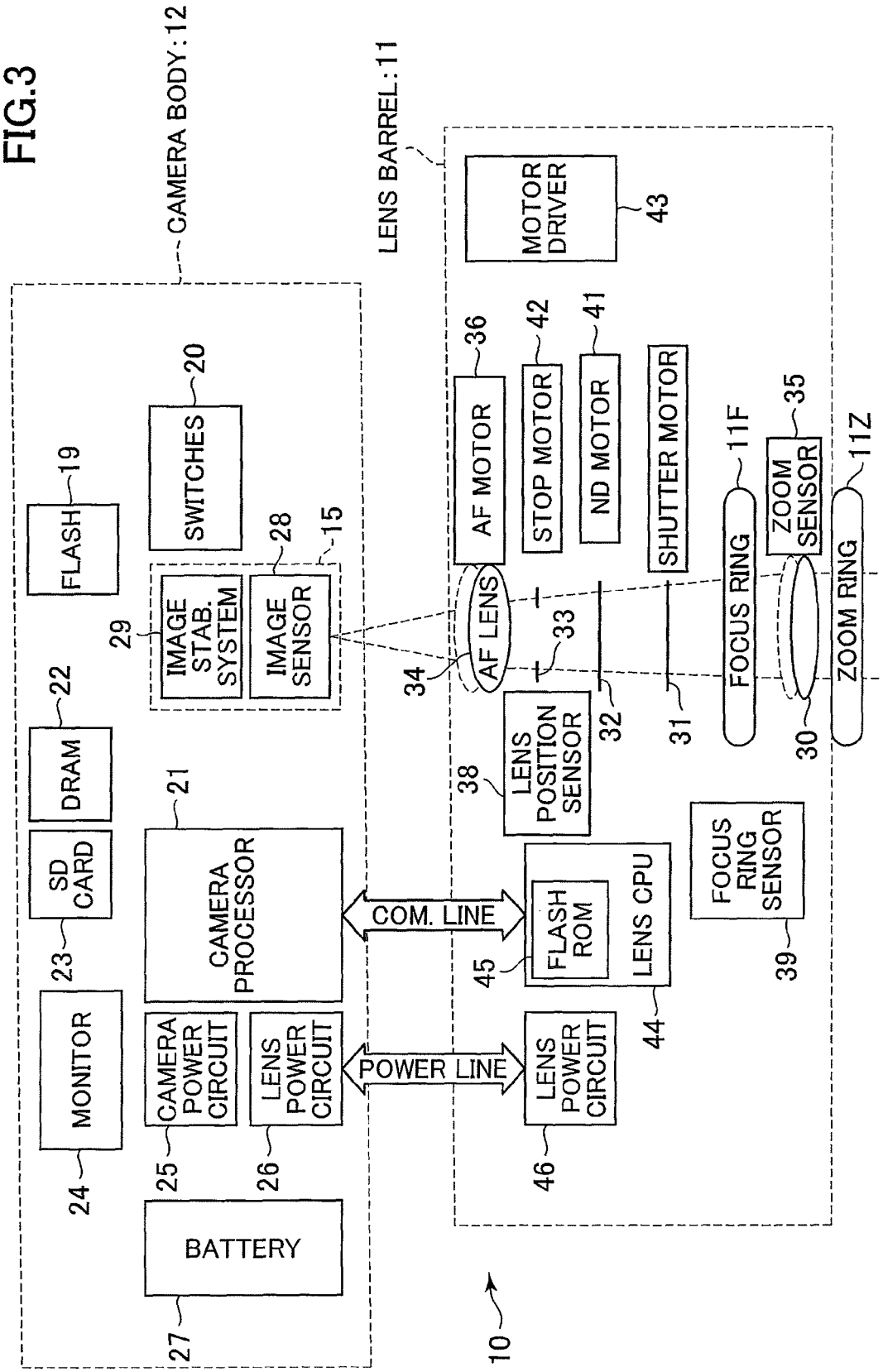
FIG. 3 is a block diagram showing the electrical construction of the interchangeable-lens camera.

FIG. 3 is a block diagram showing the electrical construction of the interchangeable-lens camera 10. In addition to the above-mentioned elements, such as the image sensor unit 15, the flash 19 and the switches including the release button 16, the camera body 12 may further include a camera processor 21, data storage devices such as a DRAM 22 and/or an SD memory card 23, a monitor 24, a camera power circuit 25, a lens power circuit 26, a battery 27 and so on.

The image sensor unit 15 may include an image sensor 28 (e.g., CMOS) and an image stabilization system 29. The image sensor 28 and the image stabilization system 29 are controlled by the camera processor 21. Images that are captured by the image sensor 28 may be displayed on the monitor 24 as live preview images. When the camera power circuit 25 is turned on, the electric power is supplied to each of the devices on the camera body 12 from the battery 27. Further, when the lens power circuit 26 is turned on, electric power is supplied to the power circuit of the lens barrel 11 mounted on the camera body 12. Although a power line and a bus are neglected in FIG. 3, all of the elements illustrated in FIG. 3 are connected to the power line and bus as desired in a manner commonly known in the art.

Light is made incident on the image sensor 18 through the photographing optical system of the lens barrel 11, which is attached to the camera body 12, and an object image is projected on the image sensor 18. The photographing optical system may include a zoom lens 30, a mechanical shutter 31, a neutral density (ND) filter 32, a stop (e.g. an iris diaphragm) 33 and focus lens 34. The zoom lens 30 is adjusted in accordance with a rotational operation of the zoom ring 11Z, and a zoom sensor 35 may detect the position of the zoom lens 30.

On the other hand, the focus lens 34 is driven by an autofocus (AF) motor 36 while the release button 16 of the camera body 12 is depressed halfway. However, the position of the focus lens 34 may also be controlled by a rotational operation of the focus ring 11F. Namely, the position of the focus lens may be detected by a lens position sensor 38 and the position of the focus ring 11F by a focus ring sensor 39. Thereby, the focus lens 34 is moved in response to a rotation of the focus ring 11F when the focus ring 11F is hand operated.

Further, the mechanical shutter 31, the ND filter 32 and the stop 33 are driven by a shutter motor 40, an ND motor 41 and a stop motor 42, respectively. Each of the motors may be driven by a lens CPU 44 inside the lens barrel 11 via a motor driver 43.

The lens CPU 44 may be operated by a program stored in a non-volatile memory, such as a flash memory 45. Electric power is supplied from the lens power circuit 46 of the lens barrel 11 to all of the devices inside the lens barrel 11. The lens power circuit 46 of the lens barrel 11 is connected to the lens power circuit 26 inside the camera body 12 through some of the contact points 14 (see FIG. 2), which may be referred to as power lines. Namely, when the camera power circuit 25 is activated, the electric power from the camera body 12 is supplied to the lens barrel.

Figure 4:
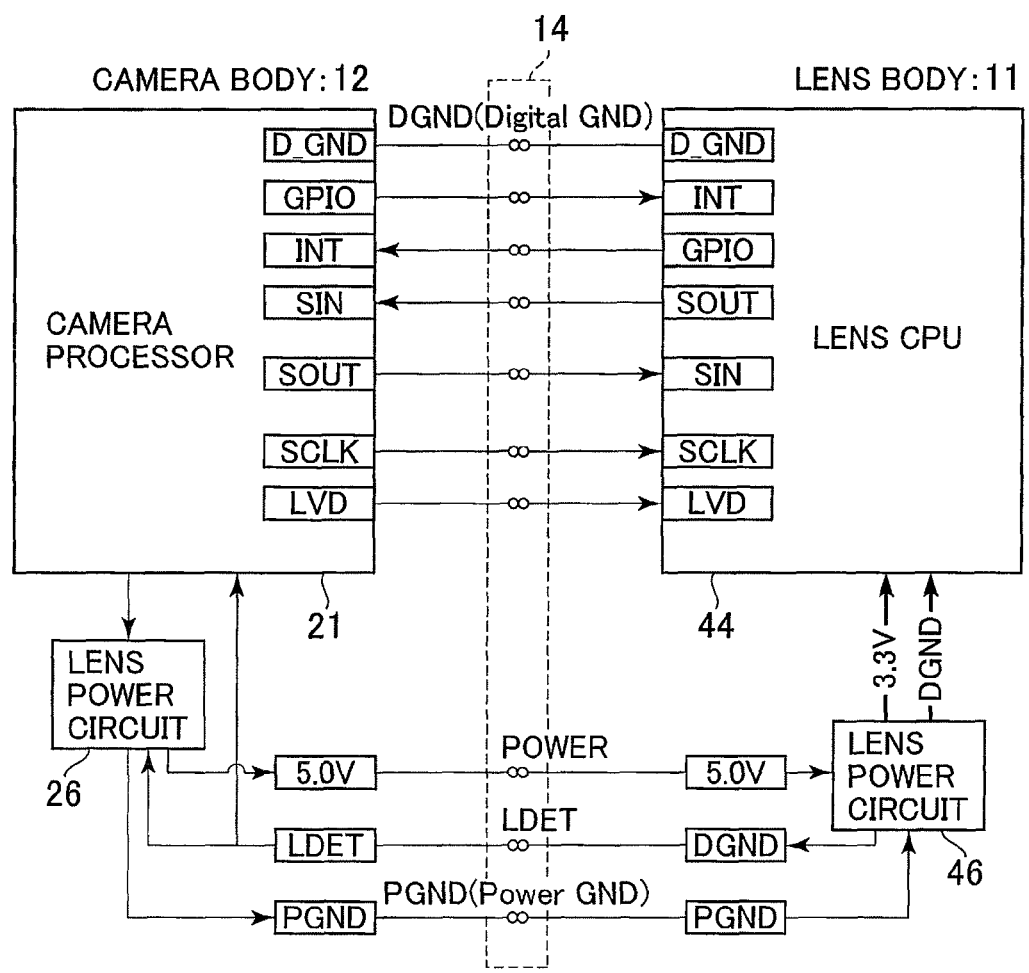
FIG. 4 is a schematic showing an electrical connection between the camera processor and lens CPU via the contact points.

FIG. 4 is a schematic showing the electrical connection between the camera processor 21 and lens CPU 44 via the contact points 14.

Both of the camera processor 21 and the lens CPU 44 include the following terminals: a digital signal ground pin DGND, a general-purpose I/O pin GPIO, an interrupt request pin INT, a serial data input pin SIN, a serial data output pin SOUT, a serial clock pin SCLK, and a lens vertical drive pin LVD for transmitting vertical drive signals. Note that the general-purpose I/O pin and the interrupt request pin INT are cross-connected to each other and also the serial data input pin SIN and the serial data output pin SOUT are cross-connected to each other while pins of the other ports are connected to the same corresponding ports on the other processor.

Further, in the present embodiment, there are ten electrical contact points 14 and the three terminals other than the above-mentioned seven terminals are connected to a power supply pin (5.0V power supply), a digital ground pin DGND (LDET) for detecting a connection, and a power ground pin PGND. Namely, these three contact points are used to connect the lens power circuit 26 of the camera body 12 to the lens power circuit 46 of the lens barrel.

The camera processor 21 detects the connection of the digital ground pin DGND of the lens power circuit 46 through the open load detection pin LDET to confirm the attachment of the lens barrel 11. The lens power circuit 26 is then activated to supply electric power to the lens power circuit 46 through the 5.0V power supply pin and the lens power circuit 46 is activated to supply electric power to each device in the lens barrel 11.

Figure 5:
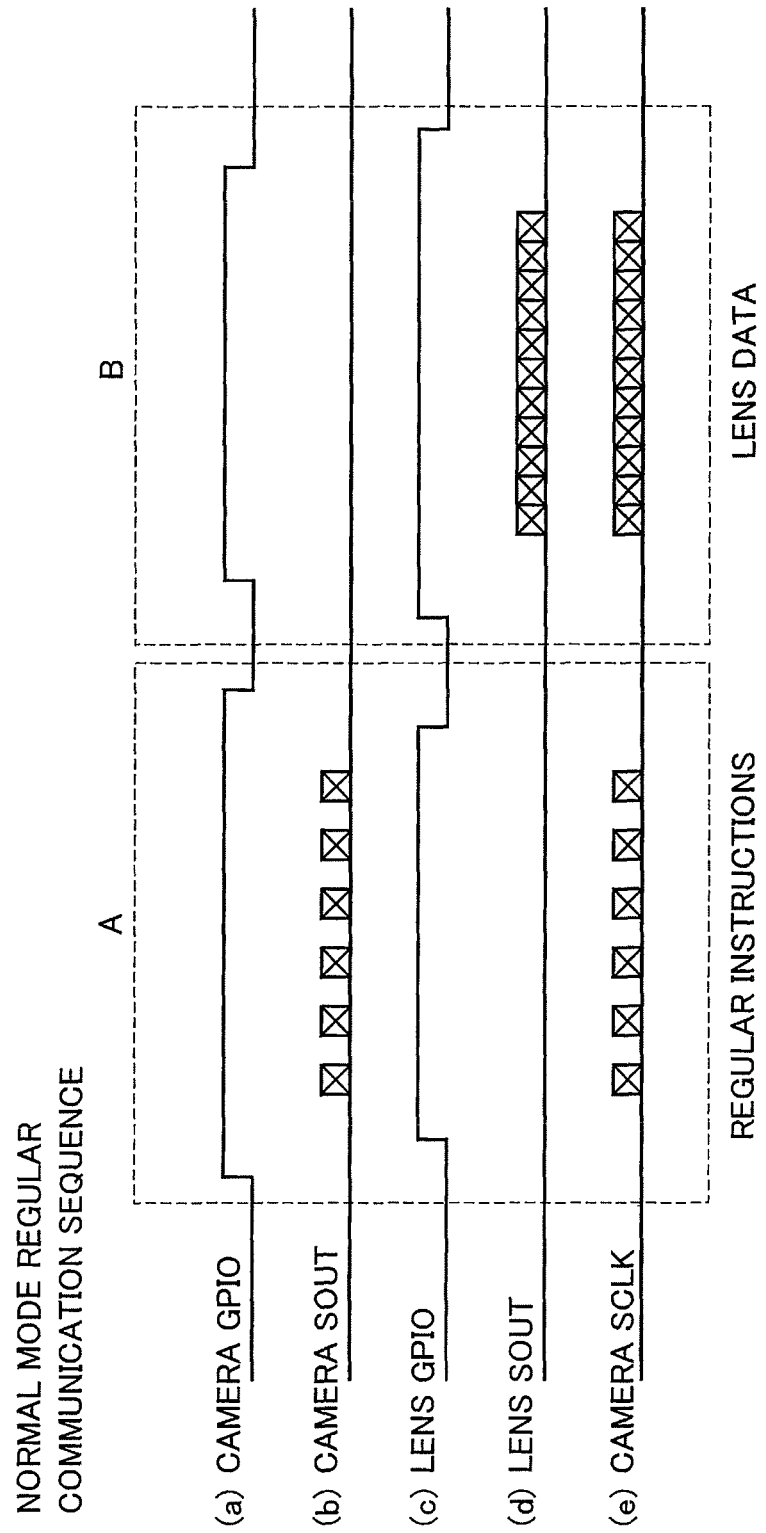
FIG. 5 schematically illustrates an example of a time sequence of the normal-mode regular communication between the camera processor and the lens CPU.

FIG. 5 schematically illustrates an example of a time sequence of the normal-mode regular communication between the camera processor 21 and the lens CPU 44. With reference to FIGS. 4 and 5, a basic sequence of the communication between the camera body 12 and the lens barrel 11 will be explained.

The communication between the camera processor 21 and the lens CPU 44 is carried out per a vertical drive signal for the image sensor 28 (see FIG. 3), which is output from the camera processor 21 via the lens vertical drive pin LVD. The sequence in FIG. 5 represents an example of the normal-mode regular communication while the normal live preview image is being captured at 60 fps. A communication sequence within one frame is illustrated in FIG. 5, as an example.

Within one frame period, the camera processor 21 and the lens CPU 44 perform a plurality of signal transmissions alternately from either side. In FIG. 5, a transmission period for the camera processor 21 is referred to as an interval "A" and a transmission period for the lens CPU 44 is referred to as an interval "B". FIG. 5(a) represents output from the general-purpose I/O pin GPIO of the camera processor 21 and FIG. 5(b) represents output from the serial data output pin SOUT of the camera processor 21. FIG. 5(c) represents output from the general-purpose I/O pin GPIO of the lens CPU 44 and FIG. 5(d) represents output from the serial data output pin SOUT of the lens CPU 44. Further, FIG. 5(e) represents clock signals fed from the camera processor 21 to the lens CPU 44 though the serial clock pin SCLK.

In the present embodiment, the general-purpose I/O pin GPIO and the interrupt request pin INT are used for counter-handshake operations. Namely, a positive waveform signal from the general-purpose I/O pin GPIO of a data transmitter represents a request for communication, for example, the positive waveform in the interval "A" of FIG. 5(a). On the other hand, a positive waveform signal from the general-purpose I/O pin GPIO of a data receiver represents permission to establish the communication, for example, the positive waveform in the interval "A" of FIG. 5(c). Further, a falling signal from the general-purpose I/O pin GPIO of the data receiver represents the completion of data receipt, for example, the falling edge in the interval "A" of FIG. 5(c). Further, a falling signal from the general-purpose I/O pin GPIO of the data transmitter represents termination of the communication, for example, the falling edge in the interval "A" of FIG. 5(a).

On the other hand, the serial data output pins SOUT and the serial input pins SIN of the camera processor 21 and the lens CPU 44 are used to transmit data. When the transmitter receives communication permission from the receiver, the transmitter transmits serial data from the serial data output pin SOUT and the serial data is received by the receiver via the serial data input pin SIN.

In the example of FIG. 5, regular instructions are transmitted from the camera processor 21 to the lens CPU 44 during the first interval "A". In turn, lens data required in the regular instructions are transmitted from the lens CPU 44 to the camera processor 21 in the next interval "B".

A frame rate of 60 fps, which is normally used in the live preview, provides a sufficient time interval for transmitting various information representing the status of the lens barrel 11 to the camera body 12. Namely, in each frame the lens barrel information, which includes data on the AF motor status, focus position, focus ring position, stop motor status, aperture value (AV), focal length, image correction, temperature, drive mode and the like, is transmitted from the lens CPU 44 to the camera processor 21 when a normal live preview image is displayed on the monitor 24 (FIG. 3) at the frame rate of 60 fps, in other words when the image sensor 28 (FIG. 3) is driven at 60 fps.

However, when the release button 16 (FIG. 1) is depressed halfway, for example, and the contrast detection autofocus (CAF) is carried out, the image sensor 28 is required to be driven at a relatively high frame rate, for example at 120 fps. As the frame rate increases, the time interval of one frame period decreases in inverse proportion; thereby, if the communication is performed under the same clock frequency as in the regular (normal) frame rate (e.g., 60 fps) during the contrast detection autofocus, one frame period may not be sufficient for transmitting all of the information of the lens barrel 11 to the camera body 12.

Figure 6:
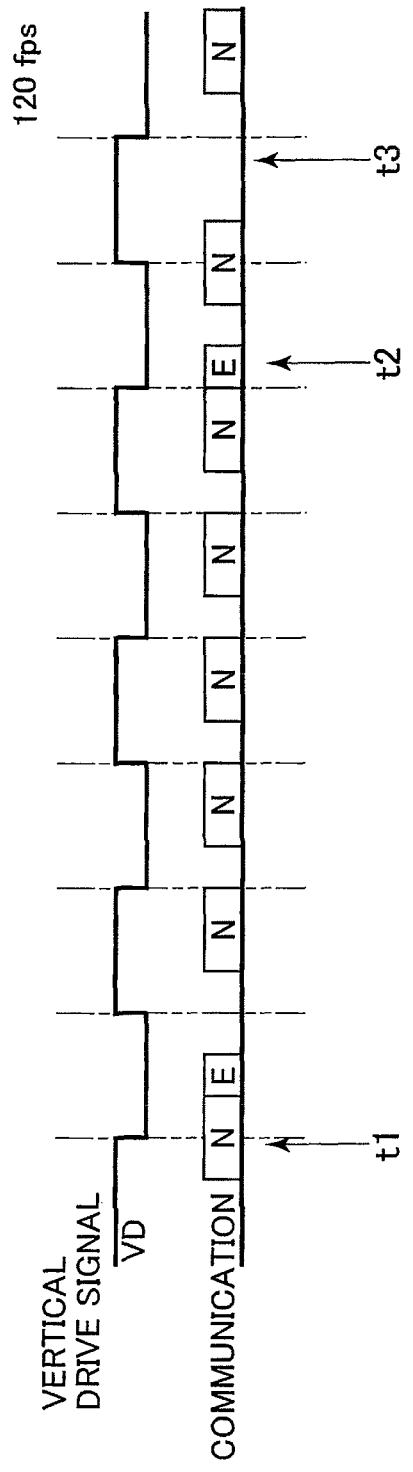
FIG. 6 indicates problems that may occur in a communication sequence without the present embodiment.

For example, as illustrated in FIG. 6, when the frame rate is accelerated to 120 fps to perform the contrast detection autofocus operation, the above-mentioned lens information "N", which is regularly transmitted at the regular (normal) frame rate, may require over two or more frames at a time point "t1". Thereby, to which frame the information belongs is unknown in this situation. Further, at a time point "t2", for example, control instructions "E" (e.g., focus drive instructions, stop drive instructions, ND drive instructions and initializing instructions) that should have been sent in the antecedent frame are transmitted in the subsequent frame, thus the instructions are one frame behind. Further, at a time point "t3", for example, lens information "N" for this frame in the normal-mode regular communication may not be sent properly.

Accordingly, in the present embodiment, when the contrast detection autofocus is started and the frame rate is increased from the regular (normal) frame rate to a relatively high frame rate, the information volume of the lens barrel 11 that is transmitted to the camera body 12 is reduced to an amount that can be transmitted within the new frame period. For example, the information of the lens barrel 11 that is transmitted to the camera body 12 is limited to data that is essential to carry out the contrast detection autofocus, such as the focus motor status, focus position and focus ring position, with this data communication hereinafter referred to as CAF regular communication. Namely, the remaining lens barrel information, such as the data pertaining to the aperture value, focal length, image correction, temperature and drive mode, which are not used during the contrast detection autofocus operation, is not transmitted. Instead, only the information required for the contrast detection autofocus operation is transmitted at a relatively high frame rate to accelerate the contrast detection autofocus operation.

Figure 7:
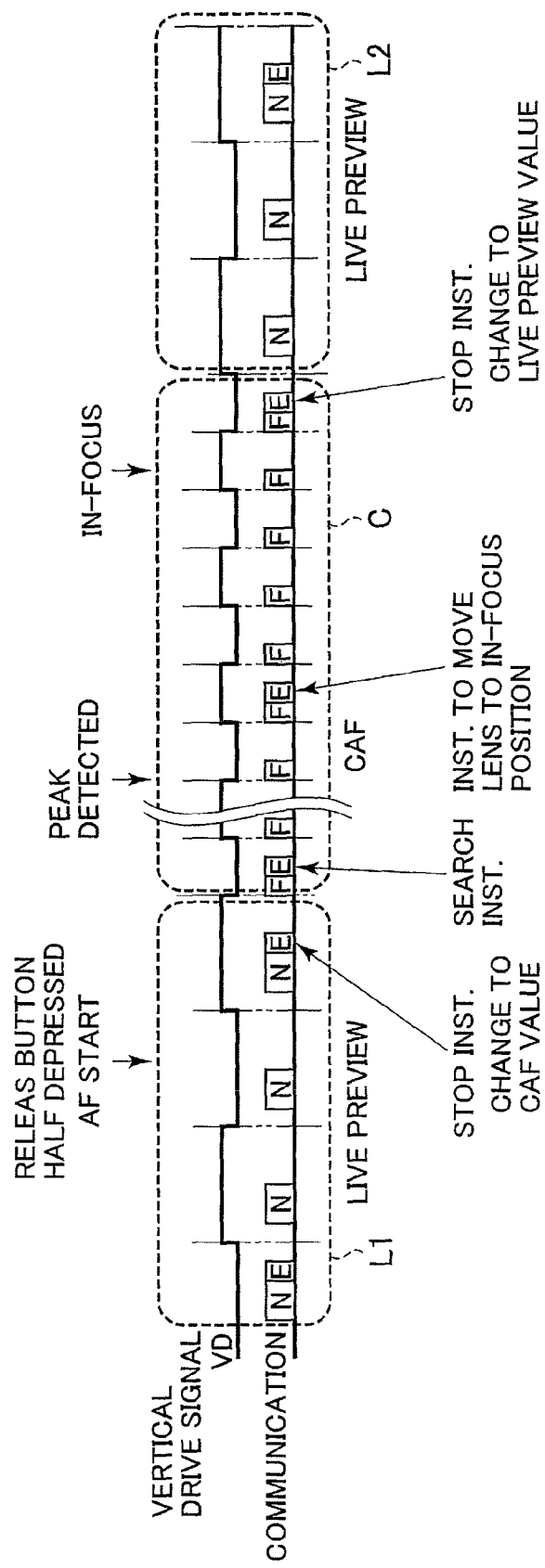
FIG. 7 shows a communication sequence of the present embodiment.

In FIG. 7 a communication sequence of the present embodiment with reference to the vertical drive signals is shown. Namely, FIG. 7 shows a situation when the release button is half depressed during the live preview (60 fps) to carry out the contrast detection autofocus (120 fps) and then redisplay the live preview (60 fps) after completion of the autofocus operation. Note that in FIG. 7 areas surrounded by the broken lines "L1" and "L2" represent intervals when the live preview are carried out (at 60 fps) and the area surrounded by the broken line "C" represents an interval when the contrast detection autofocus is carried out (at 120 fps).

In the live preview interval "L1", the camera barrel's regular information "N" is transmitted from the lens barrel 11 to the camera body 12 in each frame (of normal-mode regular communication). For example, when the camera processor 21 (FIG. 3) detects a half-depressed release button 16 (FIG. 1) in a certain frame during the live preview interval "L1", an instruction to change the stop value to a value for contrast detection autofocus is transmitted from the camera body 12 to the lens barrel 11 in the next frame. And from the frame after the next frame, the image sensor 28 is driven at the relatively high frame rate (at 120 fps) needed for the contrast detection auto focus.

In the CAF interval "C" the CAF regular communication, in which less information is transmitted than the normal-mode regular communication, is carried out between the lens barrel 11 and the camera body 12 per each frame. For example, in the first frame under the accelerated frame rate, a search instruction for detecting the peak of the contrast (which corresponds to the in-focus position) is output from the camera body 12 to the lens barrel 11. When the peak of the contrast (in-focus position) is detected in the CAF interval "C", an instruction to move the lens to the in-focus position is output from the camera body 12 to the lens barrel 11. Further, when translation of the focus lens 34 (FIG. 3) is completed in the lens barrel 11 and the in-focus status is achieved, an instruction to change the stop value to the value for the live preview is output from the camera body 12 in the next frame. Further, the frame rate changes to the regular (normal) frame rate (60 fps) in the frame after the next frame to start the live preview interval "L2".

As described above, according to the present embodiment the cycle and contents (or the amount) of data transmitted during communication between the camera body and the lens barrel are changed with respect to an operational situation of the camera so that efficient communication compatible to each frame rate can be carried out and the image sensor can also be driven at a relatively high frame rate.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2011-160093 (filed on Jul. 21, 2011), which is expressly incorporated herein, by reference, in its entirety.

The invention claimed is:

1. An imaging device comprising:
    a camera body provided with an image sensor;
    a lens barrel attachable to and detachable from the camera body;
    a lens barrel information transmitter regularly transmitting information representing the status of the lens barrel to the camera body; and
    an image sensor driver driving the image sensor at one of at least two different frame rates where a second frame rate is higher than a first frame rate;
    wherein the amount of data being transmitted for the information representing the status of the lens barrel is reduced throughout the time that the image sensor is driven at the second frame rate, compared to the amount transmitted when the image sensor is driven at the first frame rate, while the regular transmission of the information representing status of the lens barrel to the camera body continues.

2. The imaging device as in claim 1,
wherein the second frame rate is adopted in an autofocus operation based on analysis of an object image captured by the image sensor.

3. The imaging device as in claim 1,
wherein data transmission is carried out per unit of one frame.

4. The imaging device as in claim 1,
wherein information transmitted at the second frame rate comprises a focus position, a focus ring position, and focus motor status.

5. The imaging device as in claim 1,
wherein information transmitted at the first frame rate comprises the focus position, the focus ring position, the focus motor status, an aperture value (AV), a focal length, and a stop motor status.

6. The imaging device of claim 1, wherein:
the information representing the status of the lens barrel that is transmitted when the imaging sensor is driven at the first frame rate includes at least two of an AF motor status, focus position, focus ring position, stop motor value, aperture value, focal length, image correction, temperature, and drive mode, and
the information representing the status of the lens barrel that is transmitted when the imaging sensor is driven at the second frame rate is part of the information representing the status of the lens barrel that is transmitted when the imaging sensor is driven at the first frame rate.

7. A lens barrel attachable to and detachable from a camera body provided with an image sensor comprising:
a lens barrel information transmitter regularly transmitting information representing the status of the lens barrel to the camera body; and
a frame rate determiner determining whether the image sensor in the camera body is driven at a first frame rate or at a second frame rate that is higher than the first frame rate;
wherein the amount of data being transmitted for the information representing the status of the lens barrel is reduced throughout the time that the image sensor is driven at the second frame rate, compared to the amount transmitted when the image sensor is driven at the first frame rate, while the regular transmission of the information representing status of the lens barrel to the camera body continues.

8. The lens barrel of claim 7, wherein:
the information representing the status of the lens barrel that is transmitted when the imaging sensor is driven at the first frame rate includes at least two of an AF motor status, focus position, focus ring position, stop motor value, aperture value, focal length, image correction, temperature, and drive mode, and
the information representing the status of the lens barrel that is transmitted when the imaging sensor is driven at the second frame rate is part of the information representing the status of the lens barrel that is transmitted when the imaging sensor is driven at the first frame rate.

9. A camera body from which a lens barrel is attachable and detachable, comprising:
an image sensor;
a lens barrel information receiver regularly receiving information representing the status of the lens barrel; and
an image sensor driver driving the image sensor at one of at least two frame rates where a second frame rate is higher than a first frame rate;
wherein the amount of data being transmitted for the information representing the status of the lens barrel is reduced throughout the time that the image sensor is driven at the second frame rate, compared to the amount transmitted when the image sensor is driven at the first frame rate, while the regular transmission of the information representing status of the lens barrel to the camera body continues.

10. The camera body of claim 9, wherein:
the information representing the status of the lens barrel that is transmitted when the imaging sensor is driven at the first frame rate includes at least two of an AF motor status, focus position, focus ring position, stop motor value, aperture value, focal length, image correction, temperature, and drive mode, and
the information representing the status of the lens barrel that is transmitted when the imaging sensor is driven at the second frame rate is part of the information representing the status of the lens barrel that is transmitted when the imaging sensor is driven at the first frame rate.

* * * * *